US012810659B2

(12) United States Patent
Kurimoto et al.

(10) Patent No.: US 12,810,659 B2
(45) Date of Patent: Nov. 24, 2026

(54) VEHICLE AND VEHICLE INFORMATION MANAGEMENT SYSTEM

(71) Applicant: TOYOTA JIDOSHA KABUSHIKI KAISHA, Toyota (JP)

(72) Inventors: Yasuhide Kurimoto, Kasugai (JP); Hiroshi Yamasaki, Nagoya (JP); Masahiro Kagami, Nagoya (JP); Kenji Zaitsu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 18/987,758

(22) Filed: Dec. 19, 2024

(65) Prior Publication Data

US 2025/0308295 A1 Oct. 2, 2025

(30) Foreign Application Priority Data

Mar. 26, 2024 (JP) ................................ 2024-048876

(51) Int. Cl.
*G07C 5/00* (2006.01)

(52) U.S. Cl.
CPC .................................... *G07C 5/008* (2013.01)

(58) Field of Classification Search
None
See application file for complete search history.

(56) References Cited

U.S. PATENT DOCUMENTS

| | | | | |
|---|---|---|---|---|
| 2004/0204796 | A1 | 10/2004 | Harvey et al. | |
| 2007/0263632 | A1 | 11/2007 | Sobue et al. | |
| 2021/0256780 | A1 | 8/2021 | Geyer et al. | |
| 2022/0109947 | A1* | 4/2022 | Tinsley ................. | H04W 4/022 |

(Continued)

FOREIGN PATENT DOCUMENTS

| | | | |
|---|---|---|---|
| JP | 2007-264730 | A | 10/2007 |
| JP | 2015-101195 | A | 6/2015 |

OTHER PUBLICATIONS

U.S. Appl. No. 18/979,680, filed Dec. 13, 2024 (Published as US2025/0308294A1).

(Continued)

*Primary Examiner* — Shayne M. Gilbertson
(74) *Attorney, Agent, or Firm* — SoraIP, Inc.

(57) ABSTRACT

A vehicle includes an information processing device that stores vehicle information including vehicle identification information. Before a stage of providing the vehicle information to a management device, the information processing device acquires user intention information showing whether agreement of a vehicle user to disclosure of the vehicle identification information is present or absent. When the agreement of the vehicle user is present, the information processing device provides the vehicle information including the vehicle identification information to the management device. On the other hand, when the agreement of the vehicle user is absent, the information processing device acquires first identification information that is separate from the vehicle identification information, and provides first corrected vehicle information including the first identification information instead of the vehicle identification information to the management device.

3 Claims, 6 Drawing Sheets

(56) References Cited

U.S. PATENT DOCUMENTS

| | | | | |
|---|---|---|---|---|
| 2023/0098006 | A1 * | 3/2023 | Park | G07C 5/008 726/28 |
| 2023/0177202 | A1 * | 6/2023 | Makke | G06F 21/6254 726/27 |
| 2025/0308294 | A1 | 10/2025 | Kurimoto et al. | |

OTHER PUBLICATIONS

Office Action issued in U.S. Appl. No. 18/979,680 on Feb. 11, 2026.

* cited by examiner

1: VEHICLE INFORMATION MANAGEMENT SYSTEM

<FIRST COMPARATIVE EXAMPLE>

<SECOND COMPARATIVE EXAMPLE>

<THIRD COMPARATIVE EXAMPLE>

VEHICLE AND VEHICLE INFORMATION MANAGEMENT SYSTEM

CROSS-REFERENCE TO RELATED APPLICATION

This application claims priority to Japanese Patent Application No. 2024-048876 filed on Mar. 26, 2024, incorporated herein by reference in its entirety.

BACKGROUND

1. Technical Field

This disclosure relates to a technology of collecting and managing information relating to a vehicle.

2. Description of Related Art

Japanese Unexamined Patent Application Publication No. 2015-101195 (JP 2015-101195 A) discloses a vehicle information communication system. A vehicle converts a vehicle identifier unique to the vehicle into a separate identifier using conversion information. Then, the vehicle transmits vehicle state information as connected to the separate identifier to a vehicle state information server. When the use of the vehicle state information is requested by a specific business operator, the vehicle state information server transmits, to the vehicle, information for inquiring of the vehicle user as to whether the use of the vehicle state information is permitted. When the vehicle user consents to the use of the vehicle state information, the aforementioned conversion information is transmitted from the vehicle to the vehicle state information server. Using the conversion information received from the vehicle, the vehicle state information server reversely converts the separate identifier into the original vehicle identifier. Then, the vehicle state information server provides the vehicle state information as connected to the original vehicle identifier to the specific business operator.

Japanese Unexamined Patent Application Publication No. 2007-264730 (JP 2007-264730 A) discloses an information intermediation system. The information intermediation system has an information provider terminal, a user terminal, and an intermediation server. The information provider terminal transmits information to the intermediation server. The intermediation server collects and accumulates information from the information provider terminal. When providing the accumulated information to the user terminal, the intermediation server substitutes attribute information on an information provider that is not permitted to be disclosed with dummy information.

SUMMARY

According to the technology described in JP 2015-101195 A, regardless of whether the use of the vehicle state information is permitted, the vehicle identifier is converted into a separate identifier in the vehicle. This causes an increase in processing load in the vehicle.

A first aspect relates to a vehicle.

The vehicle includes an information processing device that stores vehicle information including vehicle identification information.

Before a stage of providing the vehicle information to a management device, the information processing device acquires user intention information showing whether agreement of a vehicle user to disclosure of the vehicle identification information is present or absent.

When the agreement of the vehicle user is present, the information processing device provides the vehicle information including the vehicle identification information to the management device.

On the other hand, when the agreement of the vehicle user is absent, the information processing device acquires first identification information that is separate from the vehicle identification information, and provides first corrected vehicle information including the first identification information instead of the vehicle identification information to the management device.

A second aspect relates to a vehicle information management system.

The vehicle information management system includes a vehicle that stores vehicle information including vehicle identification information, a first device that acquires the vehicle information, and a management device.

Before a stage of providing the vehicle information to the management device, the first device acquires user intention information showing whether agreement of a vehicle user to disclosure of the vehicle identification information is present or absent.

When the agreement of the vehicle user is present, the first device provides the vehicle information including the vehicle identification information to the management device.

On the other hand, when the agreement of the vehicle user is absent, the first device acquires first identification information that is separate from the vehicle identification information, and provides first corrected vehicle information including the first identification information instead of the vehicle identification information to the management device.

The management device converts the vehicle identification information included in the vehicle information into second identification information, and provides second corrected vehicle information including the second identification information instead of the vehicle identification information to another system.

According to this disclosure, before the vehicle information is provided to the management device, the user intention information showing whether agreement of the vehicle user to disclosure of the vehicle identification information is present or absent is obtained. When the agreement of the vehicle user is present, the vehicle provides the vehicle information including the vehicle identification information as is to the management device. As there is no need to convert the vehicle identification information into the first identification information in the vehicle, processing load in the vehicle is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of this disclosure will be described with reference to the accompanying drawings.

1. Vehicle Information Management System

Figure 1:
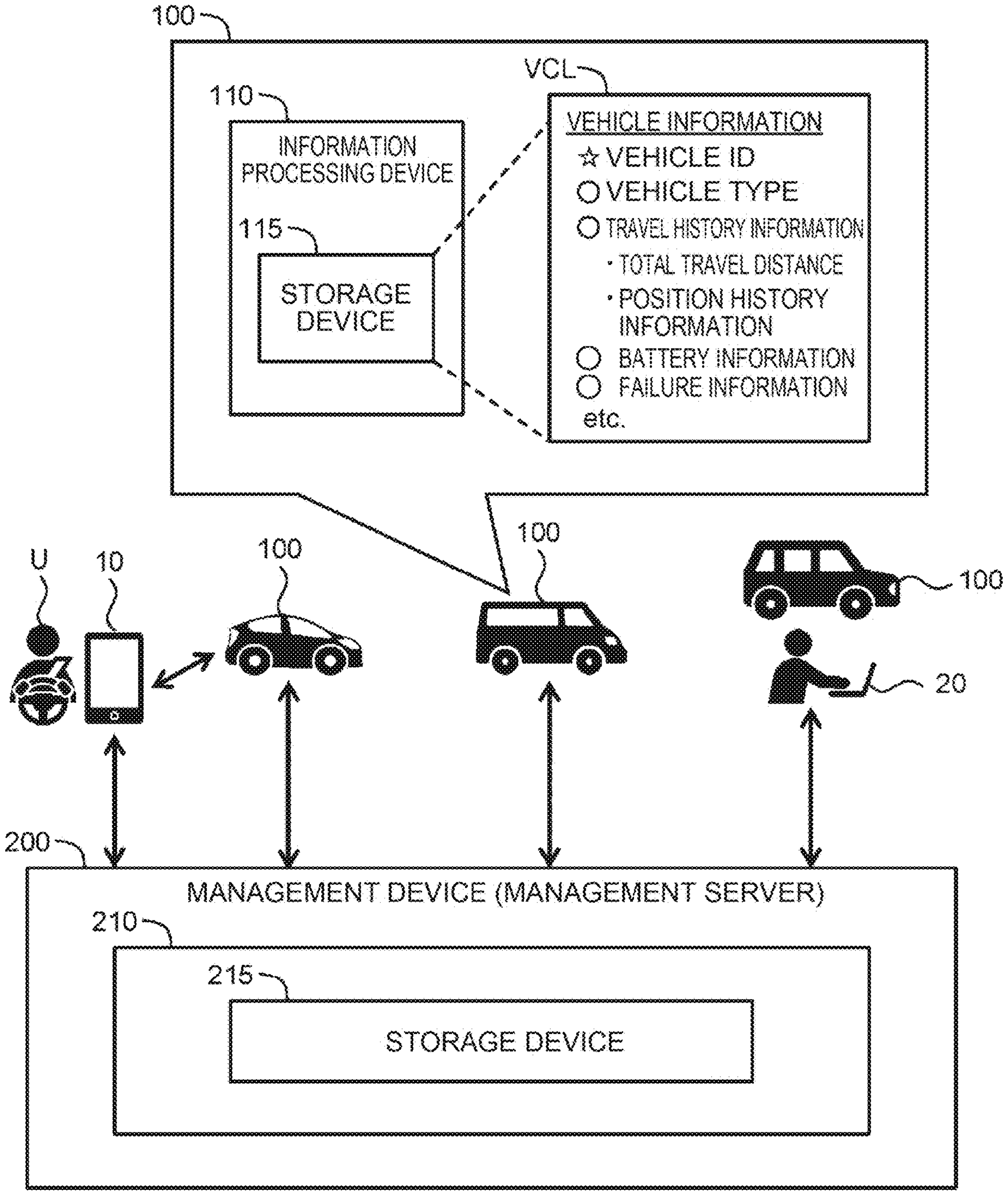
FIG. 1 is a conceptual view for describing an overview of a vehicle information management system.

FIG. 1 is a conceptual view for describing an overview of a vehicle information management system 1 according to the embodiment. The vehicle information management system 1 collects and manages information relating to vehicles 100. The vehicle information management system 1 includes one or more vehicles 100 and a management device 200. Each vehicle 100 and the management device 200 can communicate with each other through a wireless communication network.

Each vehicle 100 includes an information processing device 110. The information processing device 110 executes various types of information processing. The information processing device 110 includes one or more storage devices 115 and stores various pieces of information. Examples of the storage device 115 include a volatile memory, a nonvolatile memory, a hard disk drive (HDD), a solid-state drive (SSD), and combinations thereof. Further, the information processing device 110 performs communication with an outside through a communication interface.

For example, the information processing device 110 includes a controller, such as an electronic control unit (ECU). The information processing device 110 may include a data communication module. The information processing device 110 may include one or more processors. Examples of processors include a general-purpose processor, a special-purpose processor, a central processing unit (CPU), a graphics processing unit (GPU), an application-specific integrated circuit (ASIC), a field-programmable gate array (FPGA), an integrated circuit, and combinations thereof. The functions of the information processing device 110 may be realized through cooperation between a processor that executes a control program and the storage device 115. The control program is saved in the storage device 115. Alternatively, the control program may be recorded in a computer-readable recording medium. The information processing device 110 can also be generally called a processing circuitry.

In the storage device 115 of the information processing device 110, vehicle information (denoted by reference sign VCL) relating to the vehicle 100 is saved. Thus, the information processing device 110 stores the vehicle information VCL relating to the vehicle 100. The vehicle information VCL includes vehicle identification information (hereinafter called "vehicle ID") unique to the vehicle 100. The vehicle ID is also called a vehicle identification number (VIN). The vehicle information VCL may include the following information in addition to the vehicle ID. In other words, in the vehicle information VCL, the vehicle ID and the following information may be associated with each other.

For example, the vehicle information VCL may include vehicle type information on the vehicle 100.

As another example, the vehicle information VCL may include travel history information showing a travel history of the vehicle 100. For example, the travel history information includes a total travel distance of the vehicle 100. As another example, the travel history information may include position history information on the vehicle 100. The position of the vehicle 100 may be represented by a combination of a latitude and a longitude.

When the vehicle 100 is a battery electric vehicle (BEV) or a hybrid electric vehicle (HEV, PHEV), the vehicle information VCL may include battery information relating to an on-board battery. For example, the battery information includes battery use history information. The battery use history information includes at least one of a temperature history, a state-of-charge (SOC) history, a current history, a voltage history, a charging history, etc. Each history may be represented by a frequency distribution. The battery information may include a state of health (SOH). The SOH may be calculated based on the battery use history information.

As yet another example, the vehicle information VCL may include failure information showing the contents of a failure that has occurred in the vehicle 100. The failure information is obtained by, for example, a self-diagnosis function of the vehicle 100.

The management device 200 performs communication with the one or more vehicles 100, and collects and manages information relating to the one or more vehicles 100. The management device 200 can also be called a management server. The management device 200 may be composed of a plurality of servers that performs decentralized processing.

The management device 200 includes an information processing device 210. The information processing device 210 executes various types of information processing. The information processing device 210 includes one or more storage devices 215 and stores (retains) various pieces of information. Examples of the storage device 215 include a volatile memory, a non-volatile memory, an HDD, an SSD, and combinations thereof. Further, the information processing device 210 performs communication with an outside through a communication interface.

The information processing device 210 may include one or more processors. Examples of processors include a general-purpose processor, a special-purpose processor, a CPU, an ASIC, an FPGA, an integrated circuit, and combinations thereof. The functions of the information processing device 210 may be realized through cooperation between a processor that executes a management program and the storage device 215. The management program is saved in the storage device 215. Alternatively, the management program may be recorded in a computer-readable recording medium. The information processing device 210 can also be generally called a processing circuitry.

The vehicle information management system 1 may further include a user terminal 10. The user terminal 10 is a terminal that is used by a vehicle user U. The vehicle user U is a person who uses the vehicle 100. For example, the vehicle user U is an owner of the vehicle 100. The user terminal 10 can be, for example, an on-board terminal, a PC, a tablet, or a smartphone. The user terminal 10 can communicate with the vehicle 100 and the management device 200 through a communication network.

The vehicle information management system 1 may further include a dealer terminal 20 that is used at a vehicle dealer. By using a predetermined tool at the vehicle dealer, the vehicle information VCL can be retrieved from the storage device 115 of the vehicle 100. The vehicle information VCL retrieved from the vehicle 100 is input into the dealer terminal 20. Thus, the dealer terminal 20 can acquire the vehicle information VCL. The dealer terminal 20 can communicate with the management device 200 and the user terminal 10 through a wireless or wired communication network.

The management device 200 can collect the vehicle information VCL from at least one of the information processing device 110 of the vehicle 100 and the dealer terminal 20. Thus, the management device 200 may collect the vehicle information VCL directly from the vehicle 100 or may collect the vehicle information VCL through the dealer terminal 20. For convenience, the information processing device 110 of the vehicle 100 and the dealer terminal 20 will be collectively called "first device." The first device can acquire the vehicle information VCL as well as communicate with the user terminal 10 and the management device 200. The management device 200 performs communication with the first device and collect the vehicle information VCL from the first device.

In the following, collection and management of the vehicle information VCL in the vehicle information management system 1 according to the embodiment will be described in detail.

2. Collection and Management of Vehicle Information

As described above, the vehicle ID is unique to each vehicle 100. Therefore, the vehicle 100 can be identified from the vehicle ID. If information showing a correspondence relationship between the vehicle ID and the vehicle user U is present, the vehicle user U can also be identified from the vehicle ID. Thus, the vehicle ID can be said to have an aspect as personal information. From the viewpoint of protecting the personal information, the vehicle information VCL including the vehicle ID need be handled with due care.

According to the embodiment, before the collection of the vehicle information VCL, whether agreement of the vehicle user U to disclosure of the vehicle ID to a third party is present or absent is duly taken into account. Then, according to whether the agreement of the vehicle user U to disclosure of the vehicle ID is present or absent, the method of collecting and managing the vehicle information VCL is switched.

Figure 2:
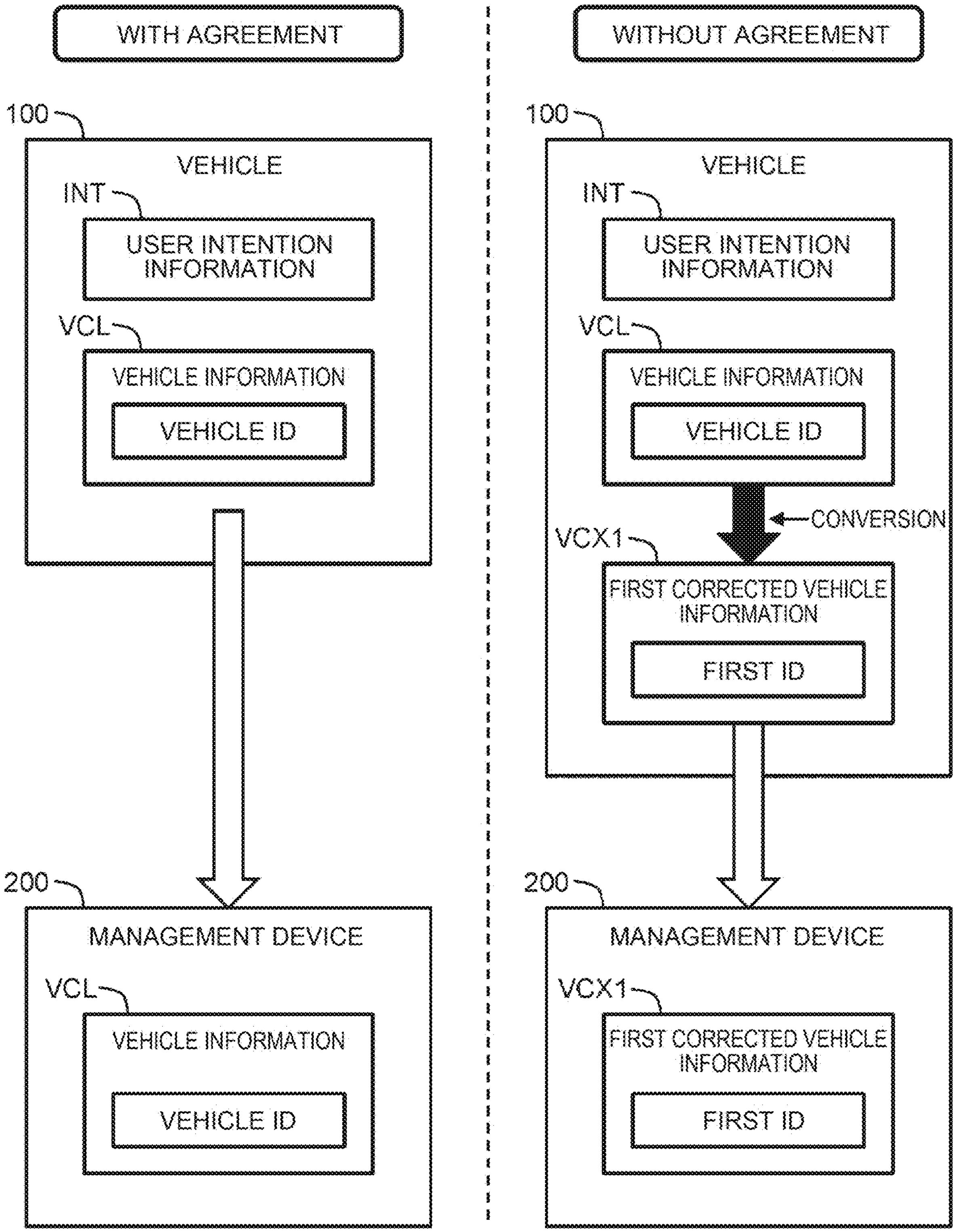
FIG. 2 is a conceptual view for describing collection and management of vehicle information.

FIG. 2 is a conceptual view for describing the collection and management of the vehicle information VCL in the embodiment. As described above, the vehicle information VCL can be collected directly from the vehicle 100 as well as can be collected through the dealer terminal 20. When generalized, "vehicle 100" in the following description will be substituted with "first device."

User intention information INT is information showing whether the agreement of the vehicle user U to disclosure of the vehicle ID to a third party is present or absent. When the vehicle user U agrees to disclosure of the vehicle ID, the user intention information INT shows "agreement." On the other hand, when the vehicle user U does not agree to disclosure of the vehicle ID, the user intention information INT shows "disagreement." The vehicle 100 acquires the user intention information INT showing the intentions of the vehicle user U of the vehicle 100. In particular, the vehicle 100 acquires the user intention information INT showing the intentions of the vehicle user U of the vehicle 100 in advance of a stage of providing the vehicle information VCL to the management device 200. For example, the vehicle user U inputs the user intention information INT using the user terminal 10. The user terminal 10 performs communication with the vehicle 100 and transmits the user intention information INT to the vehicle 100. The vehicle 100 receives the user intention information INT and saves it in the storage device 115.

When the user intention information INT shows "agreement," i.e., when the agreement of the vehicle user U is present, the vehicle 100 performs communication with the management device 200 and provides the vehicle information VCL including the vehicle ID as is to the management device 200. Thus, the vehicle 100 provides the vehicle ID and the vehicle information VCL as associated with each other to the management device 200. The management device 200 receives the vehicle information VCL including the vehicle ID through communication and stores it in the storage device 215.

On the other hand, when the user intention information INT shows "disagreement," i.e., when the agreement of the vehicle user U is absent, the vehicle 100 acquires first identification information (hereinafter called "first ID") that is separate from the vehicle ID.

For example, the vehicle 100 converts the vehicle ID into the first ID by a conversion algorithm. The algorithm used for the conversion may be shared among all the vehicles 100. Thus, the vehicle 100 may convert the vehicle ID into the first ID by a specific conversion algorithm. In this case, the first ID is not the vehicle ID itself but different for each vehicle 100. The vehicle 100 may irreversibly convert the vehicle ID into the first ID by an irreversible conversion algorithm.

As another example, the first ID may be a random number that is randomly generated.

The vehicle 100 acquires first corrected vehicle information VCX1 by substituting the vehicle ID in the vehicle information VCL with the first ID. Thus, the first corrected vehicle information VCX1 includes the first ID instead of the vehicle ID. The first corrected vehicle information VCX1 can be said to associate the first ID and another vehicle information VCL with each other. The vehicle 100 performs communication with the management device 200, and provides not the vehicle information VCL itself but the first corrected vehicle information VCX1 to the management device 200. Thus, the vehicle 100 provides the first ID and another vehicle information VCL as associated with each other to the management device 200. The management device 200 receives the first corrected vehicle information VCX1 that includes the first ID instead of the vehicle ID through communication, and stores the first corrected vehicle information VCX1 in the storage device 215.

As has been described above, according to the embodiment, before the collection of the vehicle information VCL, whether the agreement of the vehicle user U to disclosure of the vehicle ID is present or absent is taken into account. Then, according to whether the agreement of the vehicle user U to disclosure of the vehicle ID is present or absent, the method of collecting and managing the vehicle information VCL is switched.

When the agreement of the vehicle user U is present, the vehicle 100 provides the vehicle information VCL including the vehicle ID as is to the management device 200. As there is no need to convert the vehicle ID into the first ID in the vehicle 100, processing load in the vehicle 100 is reduced.

On the other hand, when the agreement of the vehicle user U is absent, the vehicle 100 does not provide the vehicle ID to the management device 200. Therefore, the vehicle ID is unlikely to leak from the management device 200 to the outside. Thus, the personal information of the vehicle user U is effectively protected. The vehicle user U is unlikely to harbor distrust or disgust toward the vehicle information management system 1.

When the agreement of the vehicle user U is present, the vehicle ID is provided as is, and therefore processing such as reversely converting the first ID into the vehicle ID afterward is not incurred. Also when the agreement of the vehicle user U is absent, of course, processing such as reversely converting the first ID into the vehicle ID is not incurred. The fact that reverse conversion is unnecessary contributes to reducing the processing load on the system as a whole. In addition, as there is no need to exchange information required for reverse conversion between the vehicle 100 and the management device 200, consumption of the communication band is reduced and so is the communication cost.

Further, when the agreement of the vehicle user U is present, the vehicle information VCL including the vehicle ID is stored in the management device 200. Therefore, the vehicle ID can be used in the management device 200. For example, the vehicle ID is advantageous for a post-market failure analysis. The management device 200 can collect failure information from a large number of vehicles 100. However, when the vehicle ID is unavailable, only statistical information relating to a failure can be obtained. It may take a long time to specifically determine the cause of the failure from the statistical information. Moreover, when the vehicle ID is not available, failure information collected from the same vehicle 100 may be redundantly counted, which may result in a decrease in the accuracy of the statistical information. A decrease in the accuracy of the statistical information leads to a decrease in the accuracy of the failure analysis. Thus, that the vehicle ID is not available leads to a decrease in the efficiency or accuracy of the failure analysis. On the other hand, when the vehicle ID is available, the vehicle 100 in which a failure has occurred can be identified, which allows efficient and accurate determination of the cause of the failure.

When the agreement of the vehicle user U is absent, the vehicle 100 provides the first corrected vehicle information VCX1 including the first ID instead of the vehicle ID to the management device 200. The first ID may be generated by being converted from the vehicle ID by a specific conversion algorithm. In this case, the first ID is not the vehicle ID itself but different for each vehicle 100. Thus, the likelihood that the failure information collected from the same vehicle 100 may be redundantly counted is reduced, and so is the likelihood of a decrease in the accuracy of statistical information relating to failures.

To more clearly describe various advantages produced by the embodiment, comparisons with various comparative examples will be made.

Figure 3:
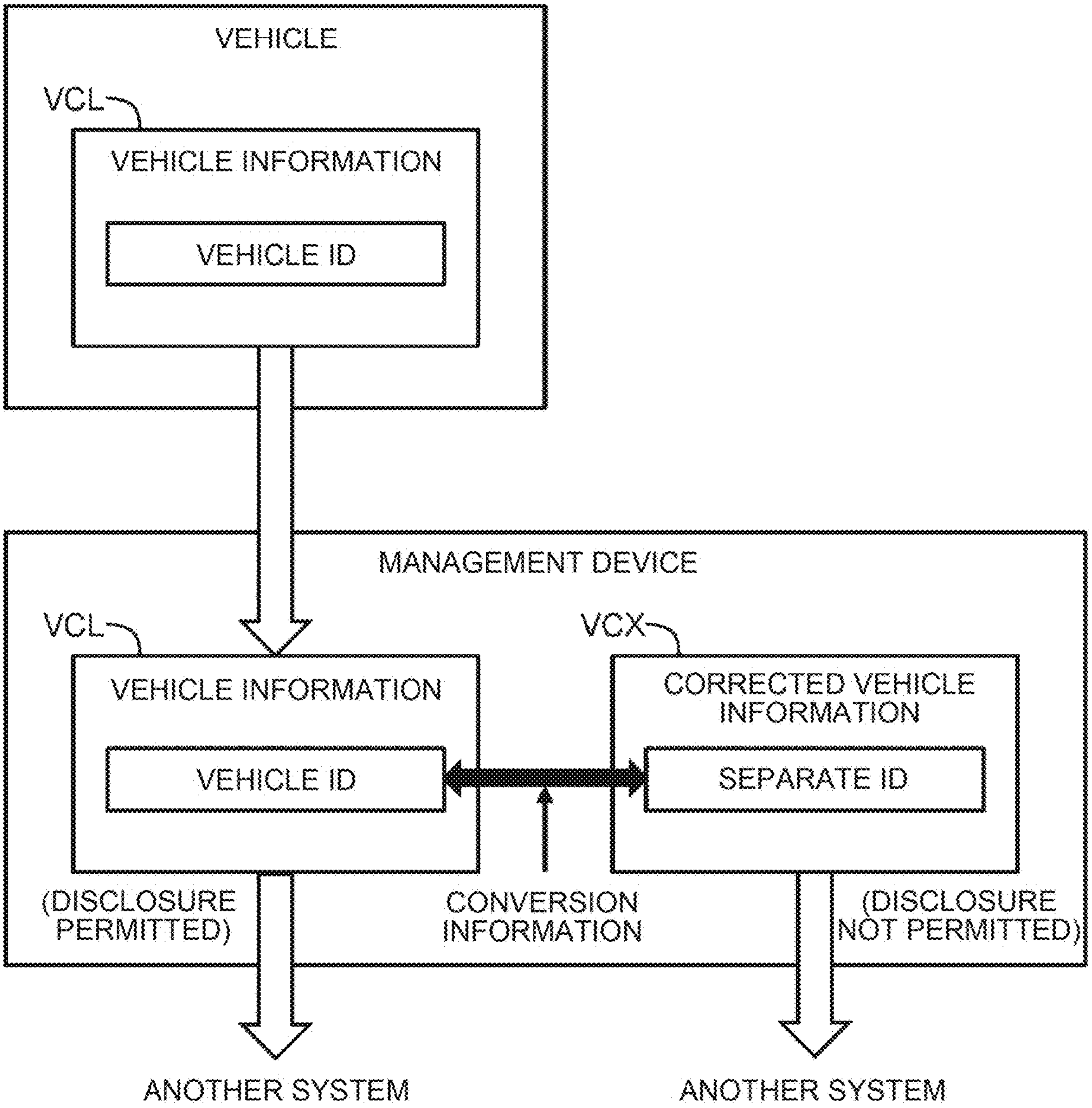
FIG. 3 is a conceptual view for describing a first comparative example.

FIG. 3 is a conceptual view for describing a first comparative example. According to the first comparative example, regardless of whether the agreement of the vehicle user U is present or absent, the vehicle information VCL including the vehicle ID is transmitted from the vehicle to the management device. Then, the vehicle information VCL including the vehicle ID is stored in the management device. When the vehicle user U does not permit disclosure of the vehicle ID to a third party, the management device converts the vehicle ID into a separate ID using conversion information and provides corrected vehicle information VCX including the separate ID to another system.

However, some vehicle users U harbor disgust or distrust about the vehicle ID being transmitted to or stored in the management device without permission. Further, there is a concern that the vehicle ID stored in the management device may leak to the outside. Moreover, since the conversion information is also stored in the management device, even when the corrected vehicle information VCX including the separate ID is provided to another system, if the conversion information leaks out from the management device, the original vehicle ID may be restored from the separate ID and the conversion information. This is not preferable from the viewpoint of protecting personal information.

By contrast, according to the embodiment, when the agreement of the vehicle user U is absent, the vehicle ID is not transmitted from the vehicle 100 to the management device 200 and the vehicle ID is not stored in the management device 200. Therefore, the vehicle user U is unlikely to harbor disgust or distrust toward the vehicle information management system 1. Further, the vehicle ID is unlikely to leak from the management device 200 to the outside. Thus, the personal information of the vehicle user U is effectively protected.

Figure 4:
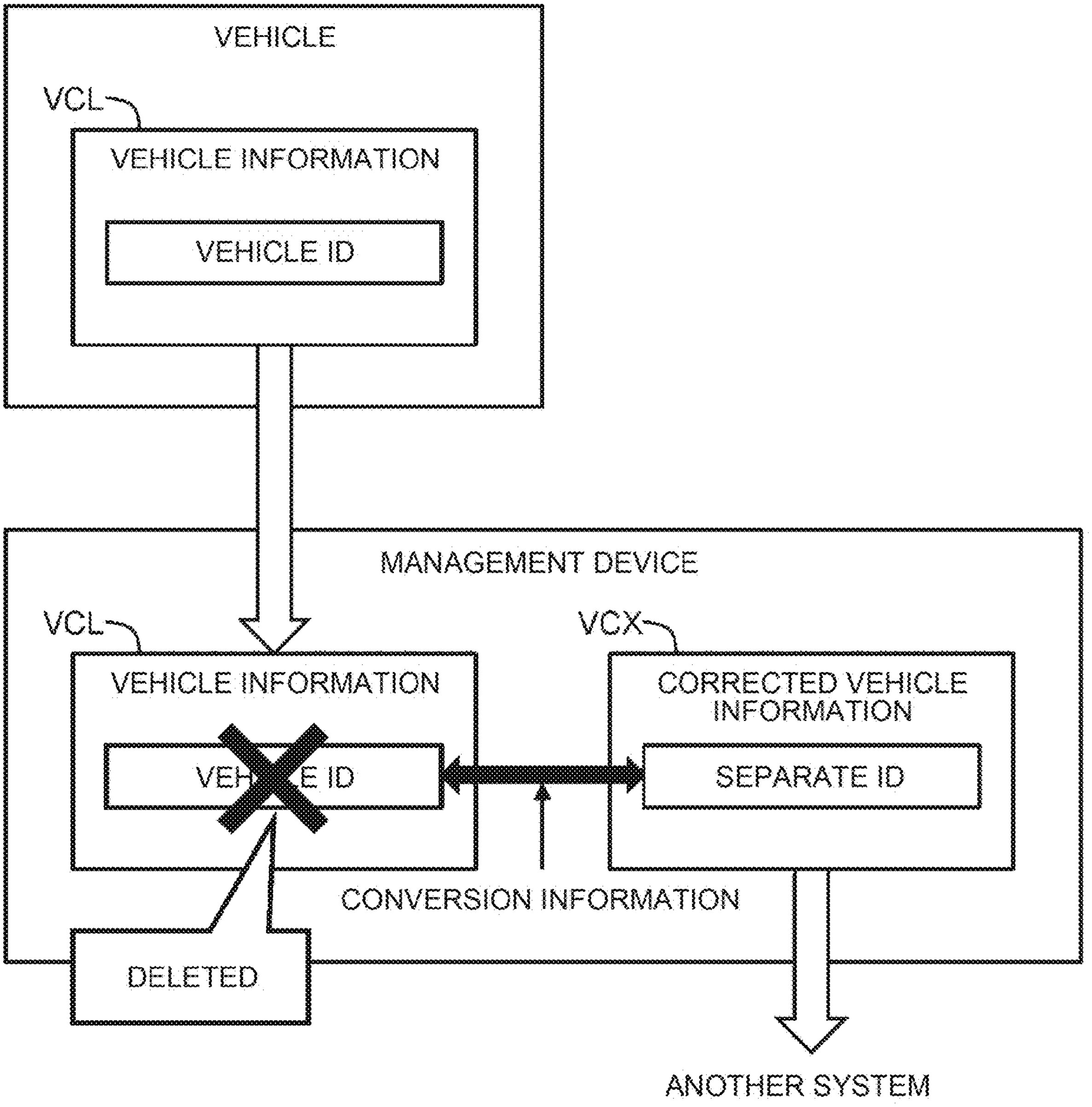
FIG. 4 is a conceptual view for describing a second comparative example.

FIG. 4 is a conceptual view for describing a second comparative example. According to the second comparative example, regardless of whether the agreement of the vehicle user U is present or absent, the vehicle information VCL including the vehicle ID is transmitted from the vehicle to the management device. The management device converts the vehicle ID into a separate ID using conversion information, and then deletes the vehicle ID. The management device provides the corrected vehicle information VCX including the separate ID to another system.

However, some vehicle users U harbor disgust about the vehicle ID being transmitted to the management device without permission. Further, according to the second comparative example, the vehicle ID is not stored in the management device, and therefore the vehicle ID cannot be used at all in the management device. As described above, the vehicle ID is advantageous for a post-market failure analysis, and being unable to use the vehicle ID at all leads to a decrease in the efficiency or accuracy of the failure analysis. That said, reversely converting the separate ID into the vehicle ID using the conversion information in the management device adds to the processing load on the management device.

By contrast, according to the embodiment, when the agreement of the vehicle user U is absent, the vehicle ID is not transmitted from the vehicle 100 to the management device 200. Thus, the vehicle user U is unlikely to harbor disgust or distrust toward the vehicle information management system 1. When the agreement of the vehicle user U is present, the vehicle ID is transmitted from the vehicle 100 to the management device 200 and therefore the vehicle ID can be used in the management device 200. This allows efficient and accurate determination of the cause of a failure. Further, when the agreement of the vehicle user U is present, the vehicle ID is provided as is, so that processing such as reversely converting the first ID into the vehicle ID afterward is not incurred. That reverse conversion is unnecessary contributes to reducing the processing load in the management device 200.

Figure 5:
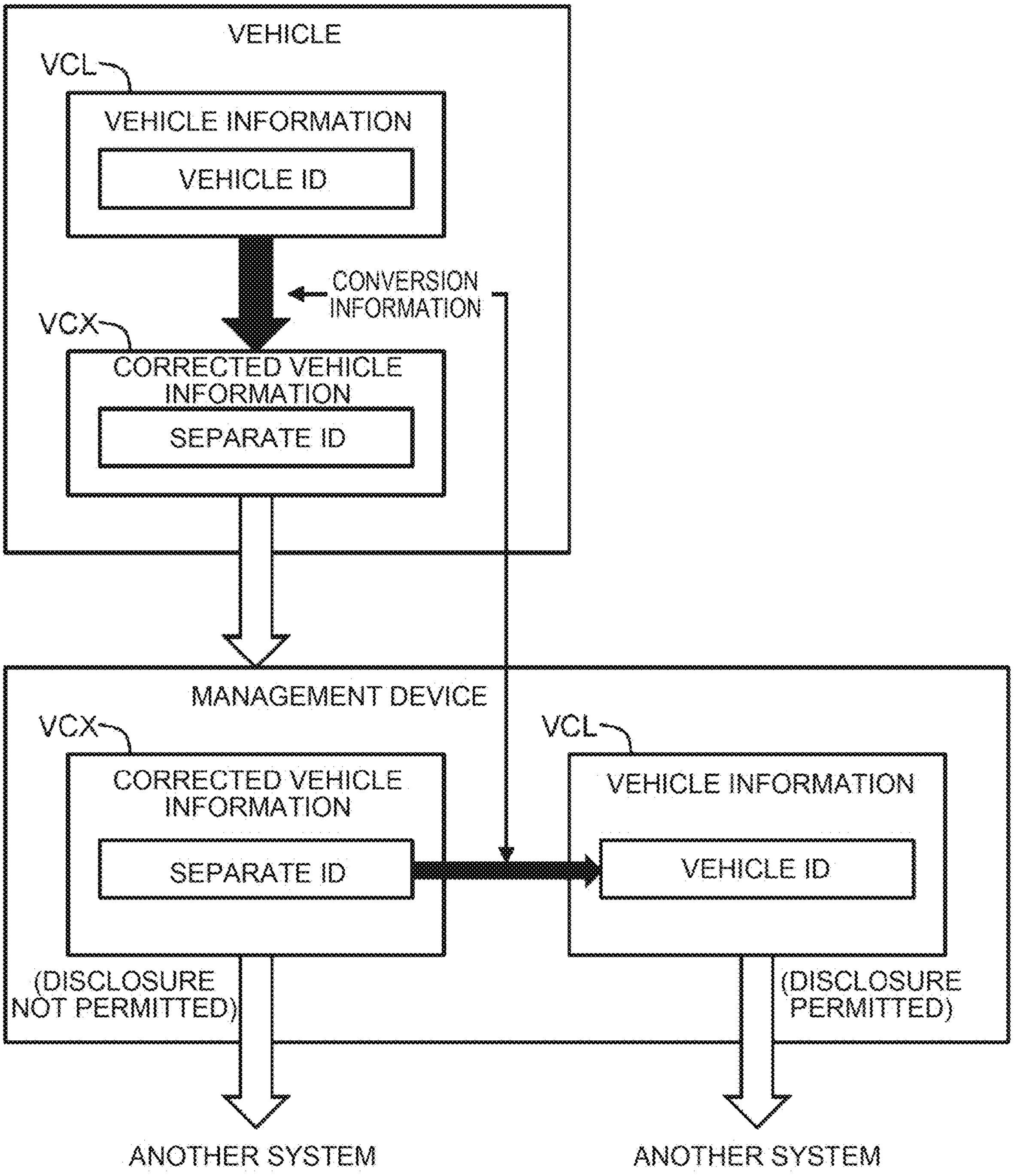
FIG. 5 is a conceptual view for describing a third comparative example.

FIG. 5 is a conceptual view for describing a third comparative example. According to the third comparative example, regardless of whether the agreement of the vehicle user U is present or absent, the vehicle converts the vehicle ID into a separate ID using conversion information. Then, the vehicle transmits the corrected vehicle information VCX including the separate ID to the management device. The management device stores the corrected vehicle information VCX including the separate ID. When the vehicle user U permits disclosure of the vehicle ID, the management device performs communication with the vehicle and requests the vehicle to provide the conversion information. In response to the request from the management device, the vehicle transmits the conversion information to the management device. Using the conversion information received from the vehicle, the management device reversely converts the separate ID into the original vehicle ID. Then, the management device provides the vehicle information VCL including the vehicle ID to another system.

However, converting the vehicle ID into a separate ID in the vehicle regardless of whether the agreement of the vehicle user U is present or absent causes an increase in processing load in the vehicle. According to the third comparative example, since the vehicle ID is basically not stored in the management device, it is difficult to use the vehicle ID in the management device. Being unable to use the vehicle ID leads to a decrease in the efficiency or accuracy of a failure analysis. Restoring the vehicle ID in the management device requires asking the vehicle to provide the conversion information as described above, which in turn requires multiple times of communication between the vehicle and the management device. This puts a strain on the communication band and causes an increase in the communication cost.

By contrast, according to the embodiment, when the agreement of the vehicle user U is present, the vehicle 100 provides the vehicle information VCL including the vehicle ID as is to the management device 200. As there is no need to convert the vehicle ID into the first ID in the vehicle 100, processing load in the vehicle 100 is reduced. Moreover, when the agreement of the vehicle user U is present, the vehicle ID is transmitted from the vehicle 100 to the management device 200 and therefore the vehicle ID can be used in the management device 200. This allows efficient and accurate determination of the cause of a failure. Further, when the agreement of the vehicle user U is present, the vehicle ID is provided as is, so that processing such as reversely converting the first ID into the vehicle ID afterward is not incurred. That reverse conversion is unnecessary contributes to reducing the processing load on the system as a whole. In addition, as there is no need to exchange information required for reverse conversion between the vehicle 100 and the management device 200, consumption of the communication band is reduced and so is the communication cost.

3. Abstraction of Travel History Information

A case where the vehicle information VCL includes travel history information showing a travel history of the vehicle 100 will be considered. The possibility that the vehicle 100 may be identified from the travel history of the vehicle 100 is not zero.

For example, the travel history information includes a total travel distance of the vehicle 100. When the total travel distance is known down to the ones place, the vehicle 100 may be identified from that total travel distance. Therefore, when providing the first corrected vehicle information VCX1 to the management device 200, the vehicle 100 (information processing device 110) may round the total travel distance included in that first corrected vehicle information VCX1. For example, rounding the total travel distance may be rounding down the fractions of the total travel distance from a predetermined place (e.g., the hundreds place, the thousands place). As another example, rounding the total travel distance may be rounding up the fractions of the total travel distance from a predetermined place. As yet another example, rounding the total travel distance may be rounding up 5 and above and rounding down 4 and below in the fractions of the total travel distance from a predetermined position. As a result, the value obtained by rounding the total travel distance becomes a value such as 1,000 km or 2,000 km. As still another example, rounding the total travel distance may be representing the total travel distance in a predetermined distance unit. While the predetermined distance used as the unit is arbitrary, examples include 500 km, 2,000 km, and 5,000 km. As one example, when representing the total travel distance in the unit of 2,000 km is considered, a total travel distance shorter than 2,000 km is represented as 0 km; a total travel distance equal to or longer than 2,000 km and shorter than 4,000 km is represented as 2,000 km; and a total travel distance equal to or longer than 4,000 km and shorter than 6,000 km is represented as 4,000 km. The same applies to a case where the predetermined distance has another value. The first corrected vehicle information VCX1 obtained by the rounding having been described above includes not the total travel distance itself but a value obtained by rounding the total travel distance. Such first corrected vehicle information VCX1 is provided from the vehicle 100 to the management device 200. Thus, protection of personal information is further enhanced.

Similarly, when providing the vehicle information VCL to the management device 200, the vehicle 100 (information processing device 110) may round the total travel distance included in that vehicle information VCL. Thus, protection of personal information is further enhanced.

As another example, the travel history information includes position history information on the vehicle 100. The position of the vehicle 100 is represented by a combination of a latitude and a longitude. The vehicle 100 may be identified from the history of the latitude and the longitude. Therefore, when providing the first corrected vehicle information VCX1 to the management device 200, the vehicle 100 (information processing device 110) may abstract the position history information included in that first corrected vehicle information VCX1. Abstracting the position history information means, for example, substituting the history of the latitude and the longitude with the name of a predetermined area (e.g., a prefecture, a municipality, a state, or a city). The first corrected vehicle information VCX1 thus obtained includes not the position history information itself but abstract position history information obtained by abstracting the position history information. Such first corrected vehicle information VCX1 is provided from the vehicle 100 to the management device 200. Thus, protection of personal information is further enhanced.

Similarly, when providing the vehicle information VCL to the management device 200, the vehicle 100 (information processing device 110) may abstract the position history information included in that vehicle information VCL. Thus, protection of personal information is further enhanced.

As yet another example, instead of the vehicle 100, the management device 200 may perform the rounding of the total travel distance or the abstraction of the position history information. This can produce the same advantages.

4. Provision of Vehicle Information to Another System

Figure 6:
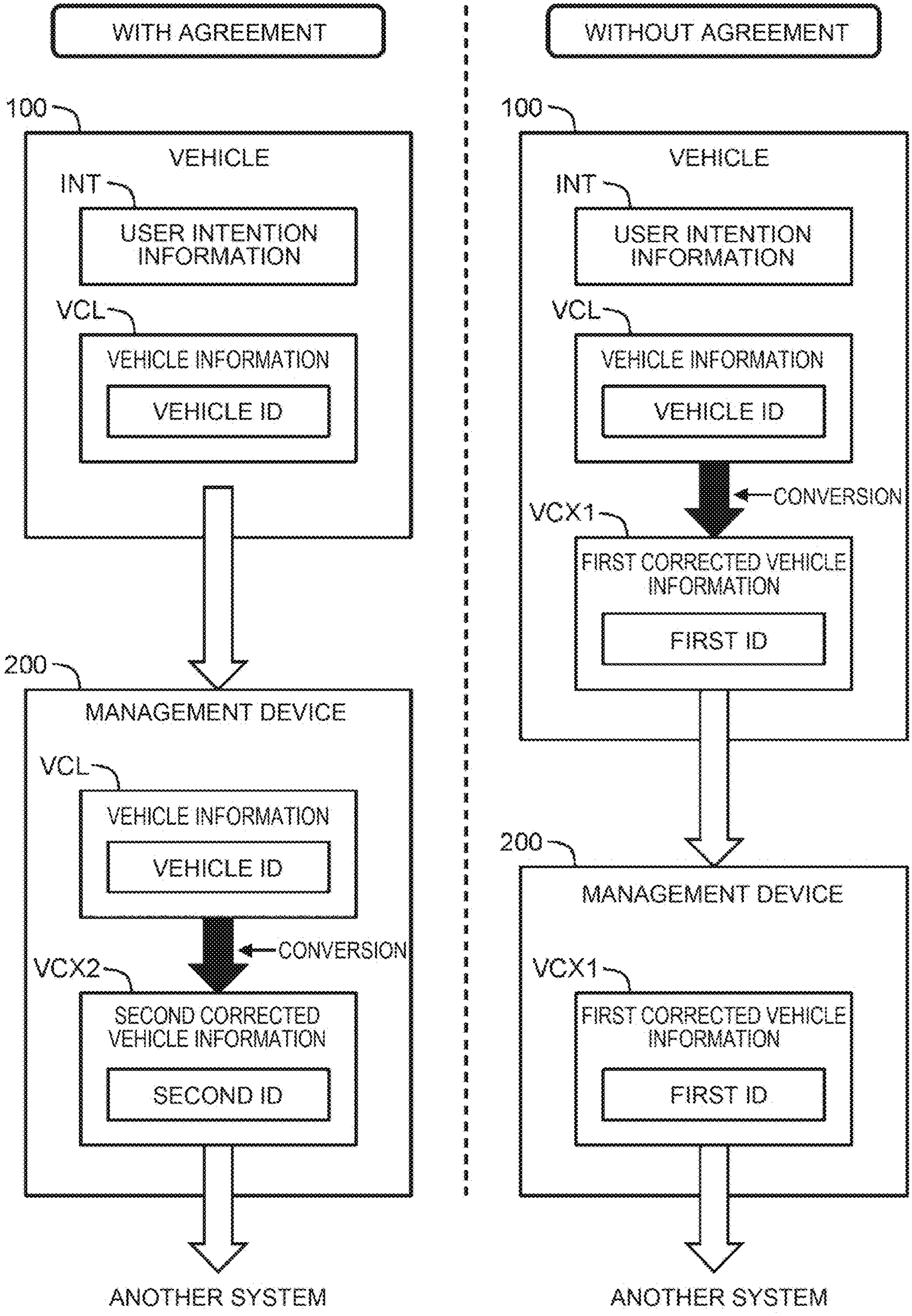
FIG. 6 is a conceptual view for describing information provision from a management device to another system.

FIG. 6 is a conceptual view for describing information provision from the management device 200 to another system. When the first corrected vehicle information VCX1 is stored in the management device 200, the management device 200 provides that first corrected vehicle information VCX1 to another system.

On the other hand, when the vehicle information VCL is stored in the management device 200, the management device 200 acquires second identification information (hereinafter called "second ID") that is separate from the vehicle ID included in the vehicle information VCL. For example, the management device 200 converts the vehicle ID into the second ID by a specific conversion algorithm. In this case, the second ID is not the vehicle ID itself but different for each vehicle 100. Further, the management device 200 may irreversibly convert the vehicle ID into the second ID by an irreversible conversion algorithm. As another example, the second ID may be a random number that is randomly generated.

The management device 200 acquires second corrected vehicle information VCX2 by substituting the vehicle ID in the vehicle information VCL with the second ID. Thus, the second corrected vehicle information VCX2 includes the second ID instead of the vehicle ID. The second corrected vehicle information VCX2 can be said to associate the second ID and another vehicle information VCL with each other. Also when the agreement of the vehicle user U is present, the management device 200 provides not the vehicle information VCL itself but the second corrected vehicle information VCX2 to another system.

As a result, regardless of whether the agreement of the vehicle user U is present or absent, the information provided from the management device 200 to another system does not include the vehicle ID. Thus, protection of personal information is further enhanced.

What is claimed is:

1. A vehicle comprising an information processing device that stores vehicle information including vehicle identification information, wherein the information processing device is configured to:

before a stage of providing the vehicle information to a management device, acquire user intention information showing whether agreement of a vehicle user to disclosure of the vehicle identification information is present or absent;

when the agreement of the vehicle user is present, provide the vehicle information including the vehicle identification information to the management device; and when the agreement of the vehicle user is absent, acquire first identification information that is separate from the vehicle identification information, and provide first corrected vehicle information including the first identification information instead of the vehicle identification information to the management device, the vehicle information further includes a total travel distance of the vehicle, and the first corrected vehicle information includes not the total travel distance itself but a value obtained by rounding the total travel distance.

2. The vehicle according to claim 1, wherein the information processing device is configured to, when the agreement of the vehicle user is absent, convert the vehicle identification information into the first identification information by a specific conversion algorithm.

3. The vehicle according to claim 1, wherein:

the vehicle information further includes position history information on the vehicle; and the first corrected vehicle information includes not the position history information itself but abstract position history information obtained by abstracting the position history information.

* * * * *